United States Patent
Waters et al.

(10) Patent No.: US 7,957,484 B2
(45) Date of Patent: Jun. 7, 2011

(54) CANDIDATE LIST GENERATION AND INTERFERENCE CANCELLATION FRAMEWORK FOR MIMO DETECTION

(75) Inventors: Deric W. Waters, Dallas, TX (US); Naftali Sommer, Rishon Le Zion (IL); Anuj Batra, Dallas, TX (US); Srinath Hosur, Plano, TX (US); Doron Burshtein, Ramat-Efal (IL); Rafi Dalla Torre, Givataim (IL); Oren Peles, Rehovot (IL); Daniel Wajcer, Beit Yeushua (IL)

(73) Assignee: Texas Instruments Incorporated, Dallas, TX (US)

( * ) Notice: Subject to any disclaimer, the term of this patent is extended or adjusted under 35 U.S.C. 154(b) by 888 days.

(21) Appl. No.: 11/930,259

(22) Filed: Oct. 31, 2007

(65) Prior Publication Data
US 2008/0137763 A1  Jun. 12, 2008

Related U.S. Application Data

(60) Provisional application No. 60/869,261, filed on Dec. 8, 2006.

(51) Int. Cl.
*H04L 27/00* (2006.01)
(52) U.S. Cl. ........................... 375/267; 375/340
(58) Field of Classification Search ............. 375/260, 375/267, 316, 340
See application file for complete search history.

(56) References Cited

U.S. PATENT DOCUMENTS

| | | | |
|---|---|---|---|
| 5,446,747 A | 8/1995 | Berrou | |
| 5,654,986 A | 8/1997 | Lim | |
| 5,805,613 A | 9/1998 | Beery et al. | |
| 6,912,684 B2 | 6/2005 | Miyata et al. | |
| 2002/0167998 A1 | 11/2002 | Penther | |
| 2004/0013212 A1 | 1/2004 | Benesty et al. | |
| 2004/0083082 A1* | 4/2004 | Onggosanusi et al. | 703/2 |

OTHER PUBLICATIONS

Foschini, G. J. et al., "Simplified processing for wireless communication at high spectral efficiency," IEEE J. Selected Areas in Communication, vol. 17, No. 11, pp. 1841-1852, 1999.
Hochwald, Bertrand M. et al., "Achieving Near-Capacity on a Multiple-Antenna Channel," IEEE Transactions on Communications, vol. 51, No. 3, Mar. 2003, pp. 389-399.
Waters, Deric, "Signal Detection Strategies and Algorithms for Multiple-Input Multiple-Output Channels," A Thesis Presented to the Academic Faculty, Georgia Institute of Technology, Dec. 2005, 122 pages. Found at: http://smartech.gatech.edu/handle/1853/7514.
Wubben, D. et al., "Efficient Algorithm for Decoding Layered Space-Time Codes," Electronics Letters, Oct. 25, 2001, vol. 37, No. 22, pp. 1348-1350.
Office Action dated Sep. 19, 2006; U.S. Appl. No. 10/618,970.
Office Action dated Feb. 1, 2007; U.S. Appl. No. 10/618,970.

\* cited by examiner

*Primary Examiner* — David B Lugo
(74) *Attorney, Agent, or Firm* — Steven A. Shaw; W. James Brady; Frederick J. Telecky, Jr.

(57) ABSTRACT

A method and system for performing Multiple-Input Multiple-Output ("MIMO") detection that reduces complexity by decomposing MIMO detection problem into two less complex problems, Candidate List generation and Interference Cancellation ("CLIC"). Embodiments of the CLIC framework parse an N element channel output into a first set containing S elements and a second set containing N–S elements. A first list of candidate vectors is generated from the first set of elements. A set of interference cancelled elements is generated by using the first list of candidate vectors to cancel interference from the second set of elements. A second list of candidate vectors is generated from the set of interference cancelled elements. A minimum cost is computed for each bit of the candidate vectors and from the costs a log-likelihood ratio is computed.

18 Claims, 7 Drawing Sheets

CANDIDATE LIST GENERATION AND INTERFERENCE CANCELLATION FRAMEWORK FOR MIMO DETECTION

CROSS-REFERENCE TO RELATED APPLICATIONS

The present application claims priority to U.S. provisional patent application Ser. No. 60/869,261, filed Dec. 8, 2006, and entitled "Candidate List Generation and Interference Cancellation Framework for MIMO Detection" hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many MIMO detection algorithms have been proposed. The maximum-likelihood detector, while conceptually simple and exhibiting optimal detection performance, is often impractical because its complexity increases exponentially with the number of input channels and constellation size. Consequently, a variety of algorithms have been proposed to solve the detection problem with reduced complexity while sacrificing minimal performance. Many MIMO detectors have been proposed exclusively as hard detectors that give only the final estimate of the channel input. Most notable is the sphere detector because it can achieve Max-Log ("ML") performance in an uncoded system with much less complexity on average. A summary of many other previously proposed MIMO detectors is given in Deric W. Waters, Signal Detection Strategies and Algorithms for Multiple-input Multiple-Output Channels (December 2005) (unpublished Ph.D. dissertation, Georgia Institute of Technology), http://etd.gatech.edu, including many variations of the sphere detector that have been proposed to minimize complexity without sacrificing performance. In Bernard M. Hochwald & Stephan ten Brink, *Achieving Near-Capacity on a Multiple-Antenna Channel*, 51 IEEE TRANSACTIONS ON COMMUNICATIONS 389-99 (2003), the list-sphere detector was proposed as a way to compute the log-likelihood ratio (LLR) for the channel input.

SUMMARY

A variety of novel techniques for Multiple Input Multiple Output ("MIMO") detection are herein disclosed. The disclosed techniques allow the MIMO detection performance/complexity trade-off to be managed by adapting various parameters. The disclosed MIMO detection framework is called Candidate List generation and Interference Cancellation ("CLIC"). The term "framework" as used herein refers to a system for providing a variety of detectors by varying the parameters of the system. The CLIC framework decomposes the MIMO detection problem into two smaller pieces, Candidate List Generation and Interference Cancellation, thus reducing the complexity of the overall MIMO detection problem. In its highest complexity configuration the CLIC framework implements the Max-Log ("ML") detector. In accordance with at least some embodiments, a method includes parsing an N element channel output into a first set containing S elements and a second set containing N−S elements. A first list of candidate vectors is generated from the first set of elements. A set of interference cancelled elements is produced by using the first list of candidate vectors to remove interference from the second set of elements. A log-likelihood ratio is provided based on the first list of candidate vectors and the set of interference cancelled elements.

In other embodiments, an apparatus includes a first candidate list generator that generates a first set of candidate vectors from a first set of elements. An interference canceller is coupled to the first candidate list generator. The interference canceller produces a set of interference cancelled elements from a second set of elements and the first set of candidate vectors.

In yet other embodiments, an apparatus includes a parser that partitions an N element channel output signal into an N−1 element channel output signal and a single element channel output signal. A candidate list generator is coupled to the parser. The candidate list generator produces a set of candidate vectors from the N−1 element channel output signal. An interference canceller is coupled to the parser and coupled to the candidate list generator. The interference canceller produces an interference cancelled signal from the set of candidate vectors and the single element channel output signal.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

Figure 1:
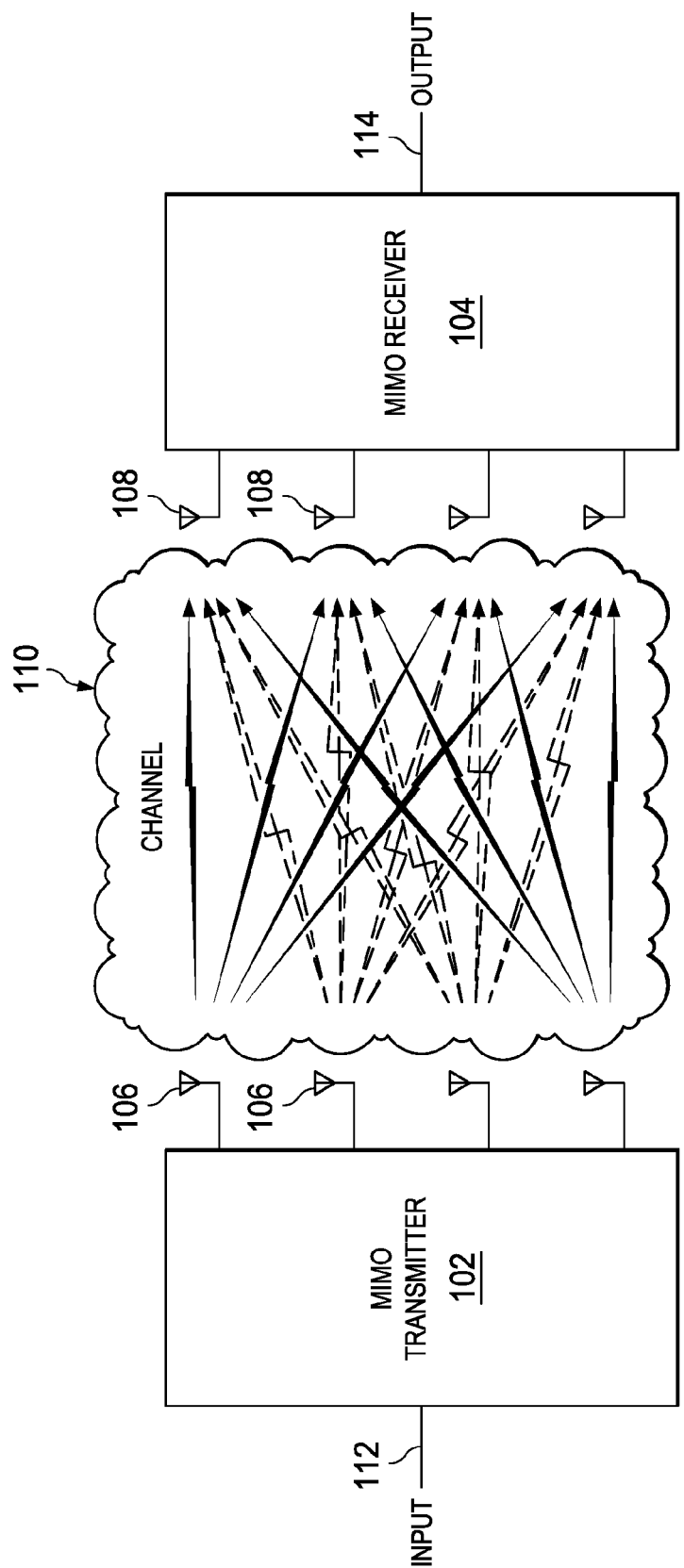
FIG. 1 shows an illustrative Multiple Input Multiple Output ("MIMO") network in accordance with embodiments of the invention.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for performing signal detection in a Multiple Input Multiple Output ("MIMO") receiver. The embodiments of the present disclosure apply the Candidate List Generation and Interference Cancellation ("CLIC") framework, as herein disclosed, to implement MIMO detectors of reduced complexity. The CLIC framework allows for management of the MIMO detector performance—complexity trade-off by adapting various parameters.

In one embodiment, the CLIC framework implements a Max-Log ("ML") detector. The CLIC framework decomposes the MIMO detection problem into two simpler problems, thus reducing complexity. In another embodiment, the CLIC framework implements an Abbreviated Max-Log ("AML") detector. The AML detector reduces complexity while suffering minimal or no performance loss relative to the ML detector.

The MIMO detection problem can be described using a narrowband channel model written as:

$$r = H\alpha + w, \quad (1)$$

where H is an M×N matrix, $\alpha = [\alpha_1 \, \alpha_2 \, \ldots \, \alpha_N]^T$ is an N dimensional vector of symbols that may be drawn from different alphabets, and the noise w has the autocorrelation matrix $E[ww^*] = \Sigma^2$, where w* denotes the conjugate transpose of w. This disclosure focuses on the case where $\Sigma^2 = I\sigma^2$, where I is the N×N identity matrix and $\sigma^2$ is the variance of the noise, but those skilled in the art will recognize that the concepts are extendable to more general cases. For example, the channel output could be left multiplied by the matrix $\Sigma^{-1}$ to achieve an effective channel whose noise has an identity autocorrelation matrix.

One embodiment of the ML detector uses a QR decomposition of the channel. This decomposition is defined as follows:

$$\begin{bmatrix} H \\ \alpha\hat{\sigma}I \end{bmatrix} \Pi = \begin{bmatrix} Q \\ \alpha\hat{\sigma}\Pi R^{-1} \end{bmatrix} R, \quad (2)$$
$$= \tilde{Q}R$$

where $\tilde{Q}$ is an (M+N)×N matrix with orthonormal columns, R is an N×N triangular matrix with positive and real diagonals, $\Pi$ is an N×N permutation matrix, $\hat{\sigma}$ is an estimate of $\sigma$, and $\alpha$ can be any positive real value. Example values of $\alpha$ are one and zero which yield the minimum mean-squared error ("MMSE") and zero-forcing ("ZF") implementations, respectively. In the present disclosure, a permutation matrix includes any matrix whose elements are either one or zero, the matrix having a single non-zero element in each column and each row. This disclosure describes the algorithm assuming an upper triangular R matrix, but those skilled in the art will recognize that the algorithm can easily be extended to describe a lower triangular matrix.

The optimal value of the parameter $\alpha$ depends on the type of MIMO detector that is used. For example, $\alpha=1$ is optimal for the linear receiver because it minimizes the mean squared error ("MSE"), $\|R^{-1}Q^H y - s\|^2$. On the other hand, $\alpha=0$ is the preferred choice for the ML receiver.

The way the permutation matrix $\Pi$ is defined impacts performance for some MIMO detectors. For example, the Bell Labs Layered Space Time ("BLAST") ordering, as disclosed in Gerald J. Foschini et al., *Simplified Processing for High Spectral Efficiency Wireless Communication Employing Multi-Element Arrays*, 17 IEEE J. ON SELECTED AREAS IN COMM. 1841-52 (1999), chooses $\Pi$ to maximize the minimum diagonal of R. A less complex way to choose $\Pi$ is the sorted-QR decomposition, disclosed in D. Wubben, *Efficient Algorithm for Decoding Layered Space-Time Codes*, 37 ELECTRONIC LETTERS 1348-50 (2001), that attempts to maximize $R_{N,N}$ (upper triangular R).

The MIMO detector problem can be simplified by creating an effective channel that is triangular. One method of triangularizing a channel uses the conjugate transpose of Q (resulting from the QR decomposition of the channel H) as follows:

$$y = Q^H r = Rs + n, \quad (3)$$

where $s = \Pi^{-1}\alpha = [s_1 \, s_2 \, \ldots \, s_N]^T$ is a permutation of the channel input vector, and n is an effective noise. Note that n may be a function of $\alpha$ when $\alpha \neq 0$. The constellation for the i-th symbol is defined as $s_i \in A_i$. The set containing all valid values of a subset of the channel inputs is denoted as $$A_{N_1}^{N_2},$$

thus $$[s_{N_1}, s_{N_1+1}, \ldots, s_{N_2}]^T \in A_{N_1}^{N_2}$$

where $N_1 \leq N_2$. The vector of the final S elements of any N dimensional vector s is denoted as $$s_S = [s_{N-S+1} \, \ldots \, s_N]^T \in A_{N-S+1}^N.$$

The set that contains all the elements of any one-dimensional constellation A having the value k in the elements' j-th bit is denoted as A(k,j). For example, $A_i(k,j)$ is the set of all valid values of $s_i$ whose j-th bit has the value k. The set that contains all the elements of any multi-dimensional constellation $$A_{N_1}^{N_2}$$

whose j-th bit in the i-th symbol have the value k is denoted as $$A_{N_1}^{N_2}(k, i, j).$$

For example, $$A_{N-S+1}^{N}(k, i, j)$$

is the set of all valid values of $s_S$ whose j-th bit in the i-th symbol maps to the value k.

The output of the ML detector is the log-likelihood ratio ("LLR") of each bit transmitted in the vector s. The LLR value indicates the probability that a given bit was transmitted as a one or zero. The ML detector output for the j-th bit of the i-th symbol is described by a single equation:

$$\lambda_{i,j}=(\|r-H\Pi s^{(O)}\|^2-\|r-H\Pi s^{(1)}\|^2)/\hat{\sigma}^2, \quad (4)$$

where $s^{(k)}$ minimizes $\|r-H\Pi s^{(k)}\|^2$ under the constraint that $$s^{(k)} \in A_1^N(k, i, j).$$

The LLR definition can also be negated if necessary to match what is expected by the decoder. The value $\|r-H\Pi x\|^2$ is defined as the cost of the vector x.

The ML detector may also be defined using the equivalent triangular channel model:

$$\lambda_{i,j}=(\|y-Rs^{(O)}\|^2-\|y-Rs^{(1)}\|^2)/\hat{\sigma}^2, \quad (5)$$

where $$s^{(k)} \in A_1^N(k, i, j)$$

minimizes $\|y-Rs^{(k)}\|^2$, $\alpha=0$, and $\Pi$ can be any permutation matrix. Note that $\|y-Rx\|^2=\|r-H\Pi x\|^2$ when $\alpha=0$.

The ML detector can be implemented in a brute-force manner by enumerating all possibilities for the vector s. However, the problem is easier to solve if it is broken into parts. Embodiments of the present disclosure provide a novel framework for implementing the ML detector based on Candidate List generation and Interference-Cancellation ("CLIC"). The CLIC framework simplifies the problem by decomposing the problem into two parts.

FIG. 1 shows an illustrative embodiment of a MIMO system in accordance with embodiments of the invention. MIMO transmitter 102 includes one or more antennas 106 for transmitting radio frequency signals. MIMO transmitter 102 may, in general, be a fixed or portable wireless device, a cellular phone, a personal digital assistant, a wireless modem card, or any other device configured to transmit on a MIMO wireless network. MIMO receiver 104 is configured to receive radio frequency signals transmitted by MIMO transmitter 102. MIMO receiver 104 includes one or more antennas 108 for receiving transmitted radio frequency signals.

MIMO transmitter 102 transmits radio frequency signals to MIMO receiver 104 through channel 110. While MIMO systems may greatly increase spectral efficiency, the process of separating signals simultaneously transmitted from multiple antennas 106 may be burdensome for receiver 104. For a symbol constellation of size A and a MIMO transmitter 102 including N transmit antennas, the brute-force implementation of the ML detector must compute $A^N$ distances between the received signal vector and each of the $A^N$ candidates for the transmitted signal vector. Thus while providing optimal performance, the computational burden may make implementation of the ML detector impractical for MIMO receiver 104. To reduce the detector's computational complexity, the MIMO receiver 104 preferably includes a detector structure based on the CLIC framework. For example, the complexity of an ML detector implementation may be reduced by employing the CLIC framework as described below to break the detection problem into two parts.

Figure 2:
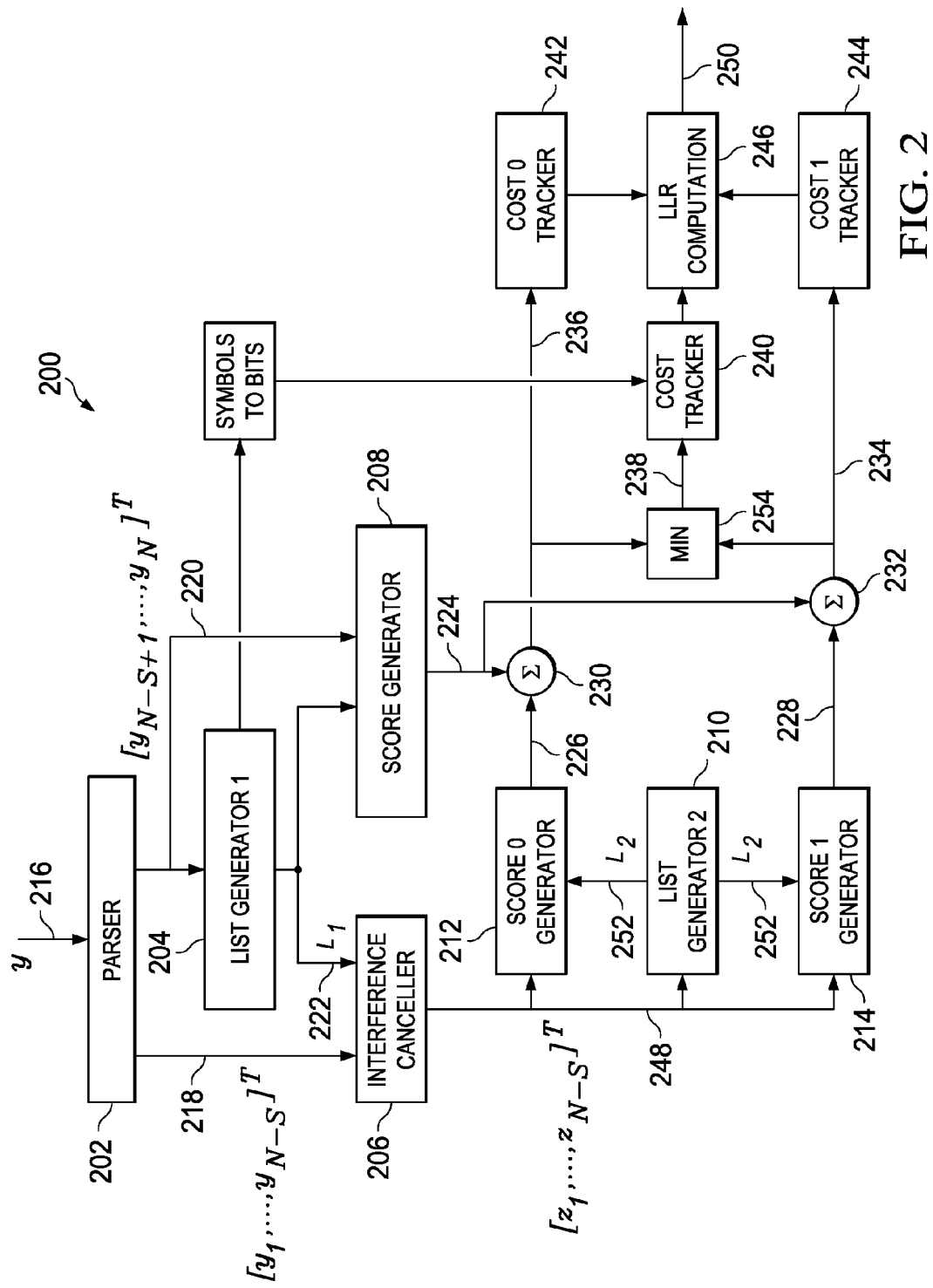
FIG. 2 shows an illustrative block diagram of the Candidate List generation and Interference Cancellation ("CLIC") framework in accordance with at least some preferred embodiments of the invention.

FIG. 2 shows an illustrative block diagram of the CLIC framework in accordance with at least some preferred embodiments of the invention. Embodiments of the CLIC framework may be used to implement a wide variety of MIMO detectors, including the ML detector and the AML detector. The CLIC framework operates on the output of a triangular channel y 216 as given by equation (3). A parser 202 parses the channel output y 216 into two partitions, a first partition 220 containing S elements and a second partition 218 containing N–S elements, where $N \geq S \geq 0$. The choice of the parameter S depends on the particular system parameters and the performance-complexity trade-off desired. In many cases the preferred embodiment uses S=N–1. The first partition 220, shown as $[y_{N-S+1} \ldots y_N]^T$, is input to List Generator 1 204 which generates a list of candidate vectors 222 for $s_S$, the permuted channel input vector. An interference canceller 206 uses the candidate vectors 222 to remove interference from the second partition 218, shown as $[y_1 \ldots y_{N-S}]^T$. The interference canceller 206 provides an output 248, shown as $[z_1 \ldots z_{N-S}]^T$, 252 to candidate list generator 2 210. The MSE for each bit is computed from a subset of the outputs of candidate list generator 2 210. The scores 226, 228 for the outputs of candidate list generator 2 210 are computed independently for each bit by score generators 212, 214. The scores 226, 228 are summed by summation logic 230, 232 with the score 224 from the first partition to produce the cost 234, 236, 238 for each bit in the candidate vector. As shown, the score 224 is produced by the score generator 208. For each vector of candidate list 222, Symbol to Bit Mapper 254 provides a unique bit string 256 used in cost tracking. Cost trackers 240, 242, 244 track the minimum cost for each bit being a zero and a one over all candidate vectors. The minimum costs are passed into an LLR computation block 246 that produces an LLR 250 for each bit.

As shown, the inputs 220, 248 to the candidate list generators 204, 210 are a subset of the channel outputs. In at least some embodiments, the input 220 is assumed to be the output of a triangular channel, in other words, there is no interference from the channel inputs $[s_1 \ldots s_{N-S}]^T$. Given the input vector and the channel matrix R, each candidate list generator 204, 210 produces a set of the L vectors (labeled $L_1$ and $L_2$) most likely to match the channel input. The candidate list generators 204, 210 preferably attempt to maximize the probability that their output lists contain the true channel input for a given L, for example maximizing $Pr(s_S \in L_1)$ is preferred. The CLIC framework works with any list-generation algorithm that outputs valid channel inputs. Perfect interference cancellation is assumed while operating on the output of the interference canceller 206, in other words it is assumed that each of the candidates in the list $L_1$ is correct as they are processed.

While all valid channel inputs are generated for embodiments of the ML detector, for other detector embodiments, the list generators 204, 210 need not provide an exhaustive list of candidates. The maximum value of $L_i$ is:

$$L_{1,Max} = \prod_{i=N-S+1}^{N} |A_i|, \qquad (6)$$

$$L_{2,Max} = \prod_{i=1}^{N-S} |A_i|, \qquad (7)$$

where $|A_i|$ is the size of the constellation from which $s_i$ is chosen. The order in which the elements of $L_i$ are considered has no impact on performance.

When $L_i < L_{i,Max}$ the choice of $\alpha$ (Equation (2)) also impacts the search for the best set of candidates $L_i$. For some embodiments, choosing $\alpha=1$ performs better for small list lengths, while choosing $\alpha=0$ performs better for large list lengths.

The choice of the permutation matrix $\Pi$ also impacts the probability that $L_i$ contains the true channel input when $L_i < L_{i,Max}$ because it can change the values of the diagonals of the matrix R. For example, if S=1, then generating the most likely candidates for $s_N$ is simplified if $\Pi$ is chosen to maximize $R_{N,N}$.

The minimum value of $L_i$ that guarantees that not all the elements in $L_i$ have the same value at any given bit location is $L_{i,Max}/2+1$. Therefore, when $L_i < L_{i,Max}/2+1$ an approximation technique is required to compensate for the insufficient list.

The interference canceller 206 operates on inputs 218 and 222, shown as $[y_1 \ldots y_{N-S}]^T$ and $\hat{s}_S = [\hat{s}_{N-S+1} \ldots \hat{s}_N]^T$ respectively. The i-th output of the interference canceller 206 is defined as:

$$z_i = y_i - \sum_{j=N-S+1}^{N} R_{i,j} \hat{s}_j, \qquad (8)$$

where $R_{i,j}$ is the element at the i-th row and j-th column of R, and $z = [z_1 \ldots z_{N-S}]^T$. Interference cancellation separates the MIMO detection problem into two pieces.

Equation (8) can be rewritten as:

$$z_i = \sum_{j=i}^{N-S} R_{i,j} s_j + \sum_{j=N-S+1}^{N} R_{i,j}(s_j - \hat{s}_j) + n_i. \qquad (9)$$

This expression for $z_i$ illustrates the influence of the perfect interference cancellation assumption. With perfect interference cancellation ($s_j = \hat{s}_j$), equation (9) simplifies to:

$$z_i = \sum_{j=i}^{N-S} R_{i,j} s_j + n_i.$$

The fact that $z_i$ is not a function of $\{s_j | j > N-S\}$, allows embodiments of the CLIC framework to decompose the MIMO problem into two smaller problems.

The cost function of any vector of constellation points $\hat{s} = [\hat{s}_1 \ldots \hat{s}_N]^T$ can be written as:

$$\|y - R\hat{s}\|^2 = \sum_{i=1}^{N} \left| y_i - \sum_{j=i}^{N} R_{i,j} \hat{s}_j \right|^2 \qquad (10)$$

$$= \|y_S - R_S \hat{s}_S\|^2 + \sum_{i=1}^{N-S} \left| y_i - \sum_{j=i}^{N} R_{i,j} \hat{s}_j \right|^2,$$

where $R_S$ is the last S rows and columns of the matrix R, $y_S = [y_{N-S-1} \ldots y_N]^T$, and $\hat{s}_S = [\hat{s}_{N-S+1} \ldots \hat{s}_N]^T$. The two terms on the right-hand side are called scores, so the cost of the vector $\hat{s}$ is the sum of the scores of its two partitions. The scores may be viewed as costs of two smaller sub-channels.

Referring again to FIG. 2, the score 224 of the first partition of $\hat{s}$ is written simply as:

$$\text{Score} = \|y_S - R_S \hat{s}_S\|^2. \qquad (11)$$

For each candidate of the first partition of $\hat{s}$, $\hat{s}_S$, the minimum score 226, 228 over all generated candidates for the second partition of $\hat{s}$ is computed for both values of each bit. This operation is defined as:

$$g(z, A) = \min_{x \in A} \left\{ \sum_{i=1}^{N-S} \left| z_i - \sum_{j=i}^{N-S} R_{i,j} x_{j-i+1} \right|^2 \right\}, \qquad (12)$$

where A may be any (N−S) dimensional set of numbers. Note that the inner-most summation is similar to the interference cancellation function. An example of this notation is $g(z, L_2(0,i,j))$, which is the minimum score where the j-th bit of $\hat{s}_i$ is zero.

A useful property of the function $g(z,A)$ is:

$$g(z, A \cup B) = \min\{g(z,A), g(z,B)\}. \qquad (13)$$

where A and B can be any sets. Referring to FIG. 2, the minimum score 226 where the j-th bit of the i-th symbol is zero is defined as:

$$\text{Score0} = g(z, A_1^{N-S}(0, i, j)). \qquad (14)$$

Similarly, the minimum score 228 where the j-th bit of the i-th symbol is one is defined as:

$$\text{Score1} = g(z, A_1^{N-S}(1, i, j)). \qquad (15)$$

As described in equation (5), two costs for each bit are generated in order to compute an LLR value. The mathematical relationship between the costs and the scores is described below.

In embodiments of the CLIC framework, the overall minimization employed to compute the minimum cost is carried out by two simpler minimizations. The cost associated with the value k for the j-th bit of the i-th symbol when i>N−S is computed as follows:

$$C_{i,j}(k) = \min_{\hat{s} \in L_1(k,i,j)} \{\|y_S - R_S\hat{s}\|^2 + g(z, L_2)\}, \quad (16)$$

where j=1, ..., $\log_2|A_i|$, and note that z and $L_2$ are functions of ŝ. The cost associated with the value k for the j-th bit of the i-th symbol when i≤N−S is computed as follows:

$$C_{i,j}(k) = \min_{\hat{s} \in L_1} \{\|y_S - R_S\hat{s}\|^2 + g(z, L_2(k,i,j))\} \quad (17)$$

where j=1, ..., $\log_2|A_i|$, and again note that z and $L_2(k,i,j)$ are functions of ŝ. After the costs for each bit are computed, the LLR is computed according to:

$$\lambda_{i,j} = (C_{i,j}(0) - C_{i,j}(1))/\hat{\sigma}^2. \quad (18)$$

This expression is mathematically equivalent to equation (5), when $$L_1 = A_{N-S+1}^N,$$

$$L_2 = A_1^{N-S},$$

and α=0.

The LLR computation as described in equations (16)-(18) can be implemented by considering one candidate for the first partition of symbols at a time, ŝ=ŝ$_S$. For each candidate, the mean-squared errors ("MSEs") $M_{0,i,j}$ and $M_{1,i,j}$ are computed for each bit in each symbol in the second partition of input symbols (i≤N−S) according to:

$$M_{k,i,j} = \|y_S - R_S\hat{s}\|^2 + g(z, L_2(k,i,j)). \quad (19)$$

Figure 5:
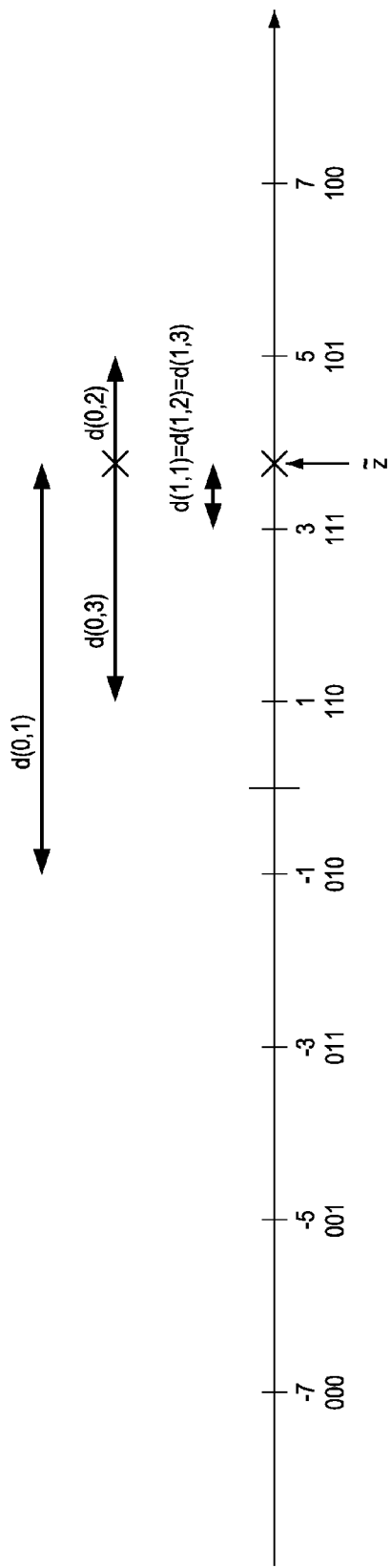
FIG. 5 shows an example of gray bit mapping for real and imaginary portions of a symbol map and illustrative computation of the function h in accordance with at least some preferred embodiments of the invention.

Referring again to FIG. 2, $M_{0,i,j}$ is the sum of Score 224 and Score0 226, and $M_{1,i,j}$ is the sum of Score 224 and Score1 228. Each candidate ŝ$_S$ corresponds to a unique bit pattern, and the smallest MSE for each bit taking on a certain value is tracked during the enumeration of the candidates ŝ$_S$. Symbol to bit mapper 254 provides a unique bit string 256 corresponding to a symbol value at its input 222. For example, FIG. 5 illustrates a Gray mapping of the real part of a 64-QAM symbol. An embodiment implementing FIG. 5 for the real part of a 64-QAM symbol outputs the bit sequence [0,0,0] if its input is −7, or [1,1,0] if its input is +1. For the Gray mapping, the symbol mapper for the imaginary part of a symbol is the same as for the real part. For this Gray mapping example, if the input to the symbol-to-bit mapper is −7+1i, then the bit sequence of the output is [0,0,0,1,1,0]. Those skilled in the art will recognize that other bit-to-symbol mappings exist and can be implemented in a similar manner.

The MSE for each bit is computed in a recursive manner, where $MSE_{k,i,j}(n)$ denotes the smallest MSE value for the j-th bit of the i-th symbol having the value k from the first n candidates of ŝ$_S$ that are enumerated. The initialization is $MSE_{k,i,j}(0)=I$, where I is ∞ or a large finite number. For the bits that belong to s$_S$, i>N−S, the smallest MSEs are tracked according to the following equation:

$$MSE_{k,i,j}(n+1) = \min(M_{0,i',j'}, M_{1,i',j'}, MSE_{k,i,j}(n)), \quad (20)$$

where k∈{0,1} depending on the bit mapping of ŝ$_S$, where i' is any symbol index from the second partition 1≤i'≤N−S, and j' indicates any bit in the i'-th symbol. Typically, i'=1 and j'=1.

Referring to FIG. 2, the computation of equation (20) is performed in the minimization block 254 and the cost tracker 240. For the remaining bits, those in the second partition of symbols, i≤N−S, the smallest MSEs are tracked according to:

$$MSE_{k,i,j}(n+1) = \min(M_{k,i,j}, MSE_{k,i,j}(n)). \quad (21)$$

Referring again to FIG. 2, the computation of equation (21) is performed in the cost 0 tracker 242 when k=0 and in the cost 1 tracker 244 when k=1.

The final MSEs for the j-th bit in the i-th symbol are the same as the costs previously defined:

$$C_{i,j}(k) = MSE_{k,i,j}(L_1), \quad (22)$$

where $L_1$ is the total number of candidates generated for s$_S$. In FIG. 2, the outputs of the cost tracker 240 are $C_{i,j}(k)$ with i>N−S, the outputs of the cost 0 tracker 242 are $C_{i,j}(0)$ with i≤N−S, and the outputs of the cost 1 tracker 244 are $C_{i,j}(1)$ with i≤N−S.

If $MSE_{k,i,j}(L_1) = \infty$ then $\lambda_{i,j}$ (equation (18)) is meaningless. Some embodiments of the invention may solve this problem by initializing all values of $MSE_{k,i,j}(0)$ to a large, but finite number, such as a large power of two. Other embodiments may overwrite $MSE_{k,i,j}(L_1)$ with another value if it is equal to infinity. For example, some embodiments may overwrite the values $MSE_{k,i,j}(L_1)$ that are equal to $MSE_{k,i,j}(0)$ with a scaled value of the largest $MSE_{k,i,j}(L_1)$ not equal to $MSE_{k,i,j}(0)$. The following equation is an example of such a method:

$$MSE_{k,i,j}(L_1) = \begin{cases} \beta_{i,j} \max_{k \in \{0,1\}, i' \in U_i(k), j' \in U_j(k,i')} (MSE_{k,i',j'}(L_1)) & \text{if } MSE_{k,i,j}(L_1) = MSE_{k,i,j}(0) \\ MSE_{k,i,j}(L_1) & \text{else,} \end{cases} \quad (23)$$

where $\beta_{i,j}$ is a scalar, $U_i(k) = \{i | MSE_{k,i,j}(L_1) \neq MSE_{k,i,j}(0), j \in \{1, ..., \log_2|A_i|\}, k \in \{0,1\}\}$, and $U_j(k,i) = \{j | MSE_{k,i,j}(L_1) \neq MSE_{k,i,j}(0)\}$. The value of $\beta_{i,j}$ should be greater than one assuming a bit value that is not represented in the candidate list is less likely to be true than those which are included in the list. The scalar $\beta_{i,j}$ may depend on i and j since some bits in some bit mappings are inherently more reliable than others.

Figure 3:
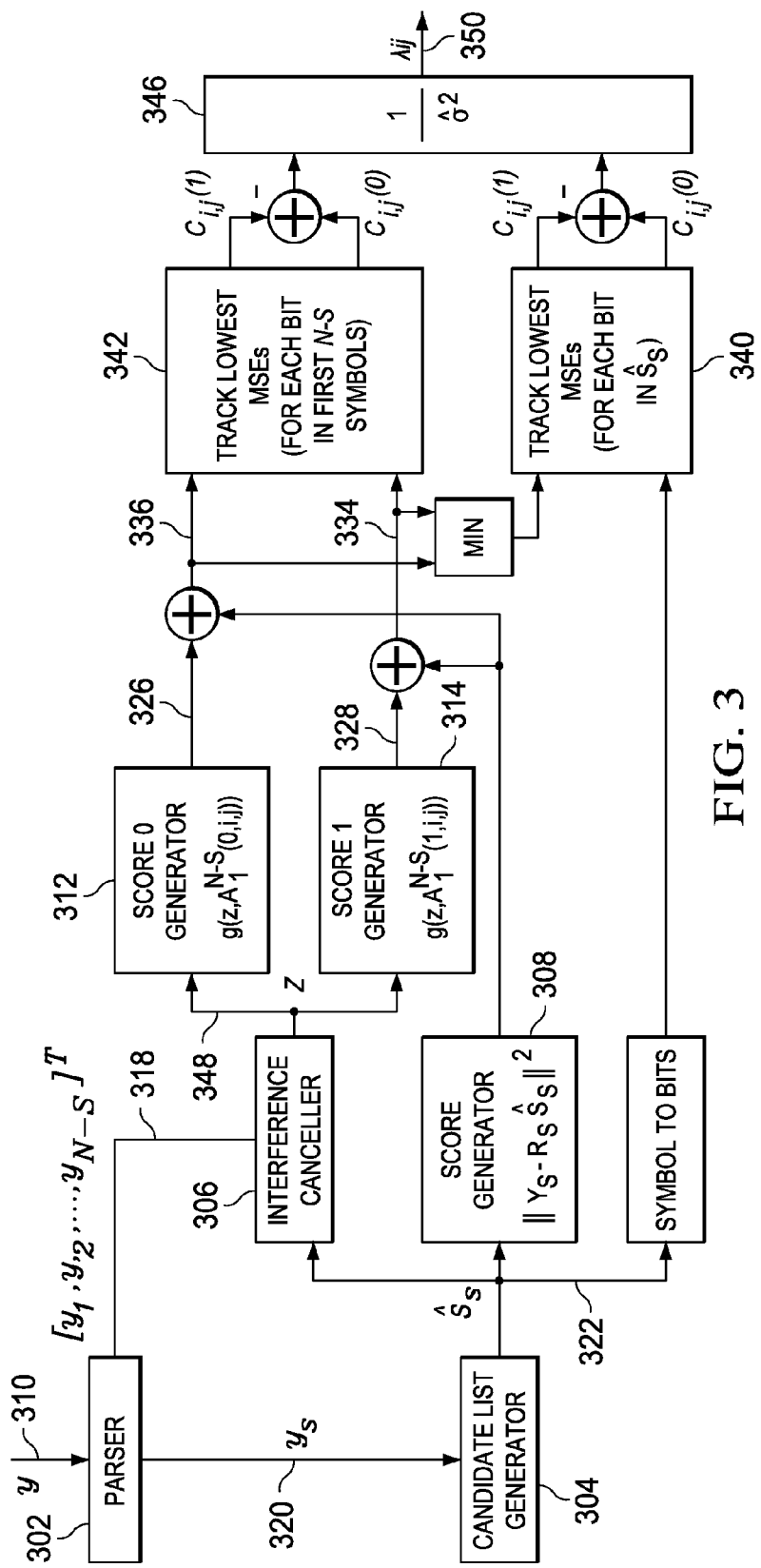
FIG. 3 shows an illustrative block diagram of a Max-Log ("ML") detector implemented in accordance with at least some preferred embodiments of the CLIC framework.

FIG. 3 shows an illustrative block diagram of an ML detector implemented in accordance with at least some preferred embodiments of the CLIC framework. The parser 302 breaks an N element channel output 310 into two sets of elements, a first set 320 containing S elements and a second set 318 containing N−S elements. Candidate list generator 304 provides a set of candidate vectors ŝ$_S$ 322 for the channel input s. Preferably, the list contains the actual channel input. The list of candidate vectors 322 and the second set of channel outputs 318 are provided to interference canceller 306, where interference is removed from the second set of channel outputs 318 to produce a set of interference cancelled elements z 348.

The present embodiment uses an exhaustive list enumeration for candidate vectors of the interference cancelled elements 348. Thus, because the list of candidate vectors is the same for any N−S element set, a second candidate generator is not shown in FIG. 3.

Scores for the candidates are generated in the score blocks 308, 312, 314. The list of candidate vectors 322 is provided to score generator 308 where a score is generated in accordance with equation (11), and to symbol to bit mapper 354 which maps each candidate to a unique bit pattern. Similarly, the interference cancelled elements 348 and corresponding exhaustive candidate lists are provided to score blocks 312, 314 where a score for each bit of each candidate vector being a zero 326 and being a one 328 is produced in accordance with equations (14) and (15) respectively.

The MSEs 334, 336 for each bit in a candidate vector are produced by summing the scores 324, 326, and by summing the scores 324, 328. The minimum MSEs for each bit are tracked in blocks 340, 342, and provided to block 346 where an LLR 350 for each bit is generated.

Figure 4:
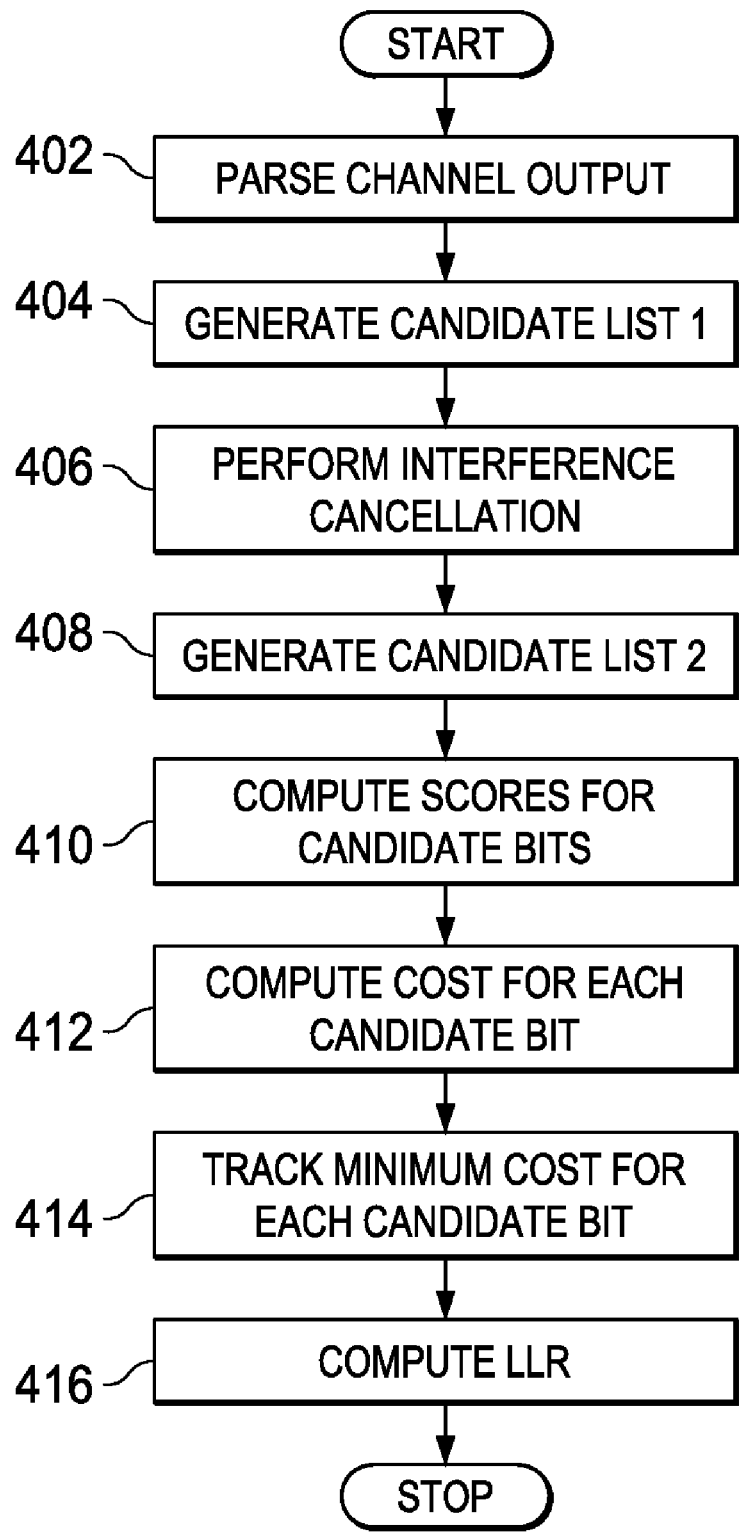
FIG. 4 shows a flow diagram for an illustrative method for applying the CLIC framework in accordance with at least some preferred embodiments of the invention.

FIG. 4 shows a flow diagram for an illustrative method for applying the CLIC framework in accordance with at least some preferred embodiments of the invention. Though depicted sequentially as a matter of convenience, at least some of the actions shown can be performed in a different order and/or performed in parallel. In block 402, an N element output of a triangular channel is parsed into two partitions. The first partition containing S elements and the second partition containing N−S elements, where N≧S≧0. The first partition of elements is provided to a first List Generator, in block 404, which generates a first list of channel input candidate vectors. The CLIC framework operates with any list generation algorithm that produces valid channel inputs. The list generation algorithm preferably maximizes the probability that the list of candidate vectors it produces contains the actual channel input.

The second partition of channel outputs, along with the first list of candidate vectors is provided to an interference cancellation component in block 406. Interference cancellation allows the CLIC framework to decompose the MIMO detection problem into two parts, reducing the complexity of the problem overall. The interference cancellation component uses the candidate vectors to remove interference from the second partition of channel outputs. The set of interference cancelled elements is provided to a second candidate list generator, in block 408, which produces a second list of channel input candidate vectors.

In block 410, the scores for the outputs of each candidate list generator are computed independently for each bit. The scores are summed to produce the cost of each bit in the candidate vector in block 412. The minimum cost for each bit being a zero and each bit being a one is tracked over all candidate vectors in block 414. In block 416, an LLR is computed for the tracked minimum costs of each bit.

The Abbreviated Max-Log ("AML") detector is one embodiment of a MIMO detector based on the CLIC framework. The AML detector reduces the complexity of the MIMO detection problem by setting S=N−1. A list enumeration technique provides the first N−1 symbols, in conjunction with an exhaustive list enumeration for the final symbol. The AML detector can employ any list enumeration technique for the first N−1 symbols; the handling of the final symbol is a distinctive feature of the AML detector. Embodiments of the AML detector implement the function g(z,A) in a computationally efficient manner when S=N−1. The brute-force approach is to compute all the possible values and take the minimum. One embodiment of the AML detector is to implement this brute-force computation. An alternative embodiment of the AML detector implements the minimization based on look-up tables.

When S=N−1, the vector z from interference cancellation (equation 8) is a scalar value, and the function g(z,A) simplifies to:

$$g(z_1, A) = \min_{x \in A}\{|z_1 - R_{1,1}x|^2\}. \tag{24}$$

For given inputs $z_1$ and A, $g(z_1,A)$ depends on the channel. A simple transformation yields a similar minimization function that is independent of the channel:

$$g(z_1, A(k, j)) = \min_{x \in A(k,j)} |z_1 - R_{1,1}x|^2 \tag{25}$$
$$= R_{1,1}^2 \min_{x \in A(k,j)} \left| \frac{z_1}{R_{1,1}} - x \right|^2$$
$$= R_{1,1}^2 f_{k,j}\left(\frac{z_1}{R_{1,1}}, A\right),$$

where $$f_{k,j}(\tilde{z}, A) = \min_{x \in A(k,j)} |\tilde{z} - x|^2. \tag{26}$$

For given inputs $\tilde{z}=z_1/R_{1,1}$ and A, $f_{k,j}(\tilde{z},A)$ is independent of the channel. Therefore, $f_{k,j}(\tilde{z},A)$ can be pre-computed for a range of $\tilde{z}$ values and stored in a look-up table or it can be computed by the hardware as needed. If a look-up table is not used the score may be computed using either $g(z_1,A(k,j))$ directly, or using by replacing the look-up table with a direct computation of $f_{k,j}(\tilde{z},A)$.

Some symbol-to-bit mappings are structured such that the real and imaginary parts of the symbol map to bit values independently. Gray coding is an example of such a symbol-to-bit mapping. With a separable symbol-to-bit mapping, the bits corresponding to the real part of $\tilde{z}$ are independent of the imaginary part of $\tilde{z}$, and vice versa. This allows the computation of $f_{k,j}(\tilde{z},A)$ to be simplified further by separating the real and imaginary parts. For the j-th bit of $s_1$ the function $f_{k,j}(\tilde{z},A)$ is computed as:

$$f_{k,j}(\tilde{z}, A) = \begin{cases} h(\tilde{z}_R, A_R(k, j)) + h(\tilde{z}_I, A_I), & j \leq \frac{\log_2|A|}{2} \\ h(\tilde{z}_I, A_I(k, j)) + h(\tilde{z}_R, A_R) & \text{else,} \end{cases} \tag{27}$$

where $\tilde{z}=\tilde{z}_R+\tilde{z}_I\sqrt{-1}$, where $A_R$ and $A_I$ are the projections of A onto the real and imaginary axis, respectively, and $h(\tilde{z},A) = \min_{x \in A}|\tilde{z}-x|^2$. While this also assumes that the first $\log_2|A|/2$ bits map to the real part of the symbol, other bit assignments are possible and the present disclosure encompasses all such assignments. $A_R(k,j)$ and $A_I(k,j)$ are the elements from $A_R$ and $A_I$, respectively, whose j-th bits have the value k.

A useful property of the function $h(\tilde{z},A)$ is:

$$h(\tilde{z}, A \cup B) = \min\{h(\tilde{z},A), h(\tilde{z},B)\}. \tag{28}$$

where A and B can be any sets. This property can be applied as follows:

$$h(\tilde{z}_I, A_I) = \min\{h(\tilde{z}_I, A_I(0,j)), h(\tilde{z}_I, A_I(1,j))\}. \tag{29}$$

As an example of $h(\tilde{z},A)$ computation, let A be the 64-QAM constellation, then $A_R=A_I=\{\pm1,\pm3,\pm5,\pm7\}$. FIG. 5 shows the Gray bit mapping for both $A_R$ and $A_I$. From FIG. 5 the necessary subsets are defined as:

$A_R(1,1)=\{1,3,5,7\}, A_R(0,1)=\{-1,-3,-5,-7\}, A_R(1,2)= \{\pm1,\pm3\}, A_R(0,2)=\{\pm5,\pm7\}, A_R(1,3)=\{\pm3,\pm5\}, A_R(0,3)=\{\pm1,\pm7\},$ where $A_R(k,j)=A_I(k,j)$. In this example, for each value of $\tilde{z}_R=\tilde{z}$, the h function is computed at least four times according to:

$$h(\tilde{z}_R=\tilde{z}, A_R(k,j))=|d(k,j)|^2, \tag{30}$$

where the d(k,j) values are illustrated in FIG. 5.

Figure 6A:
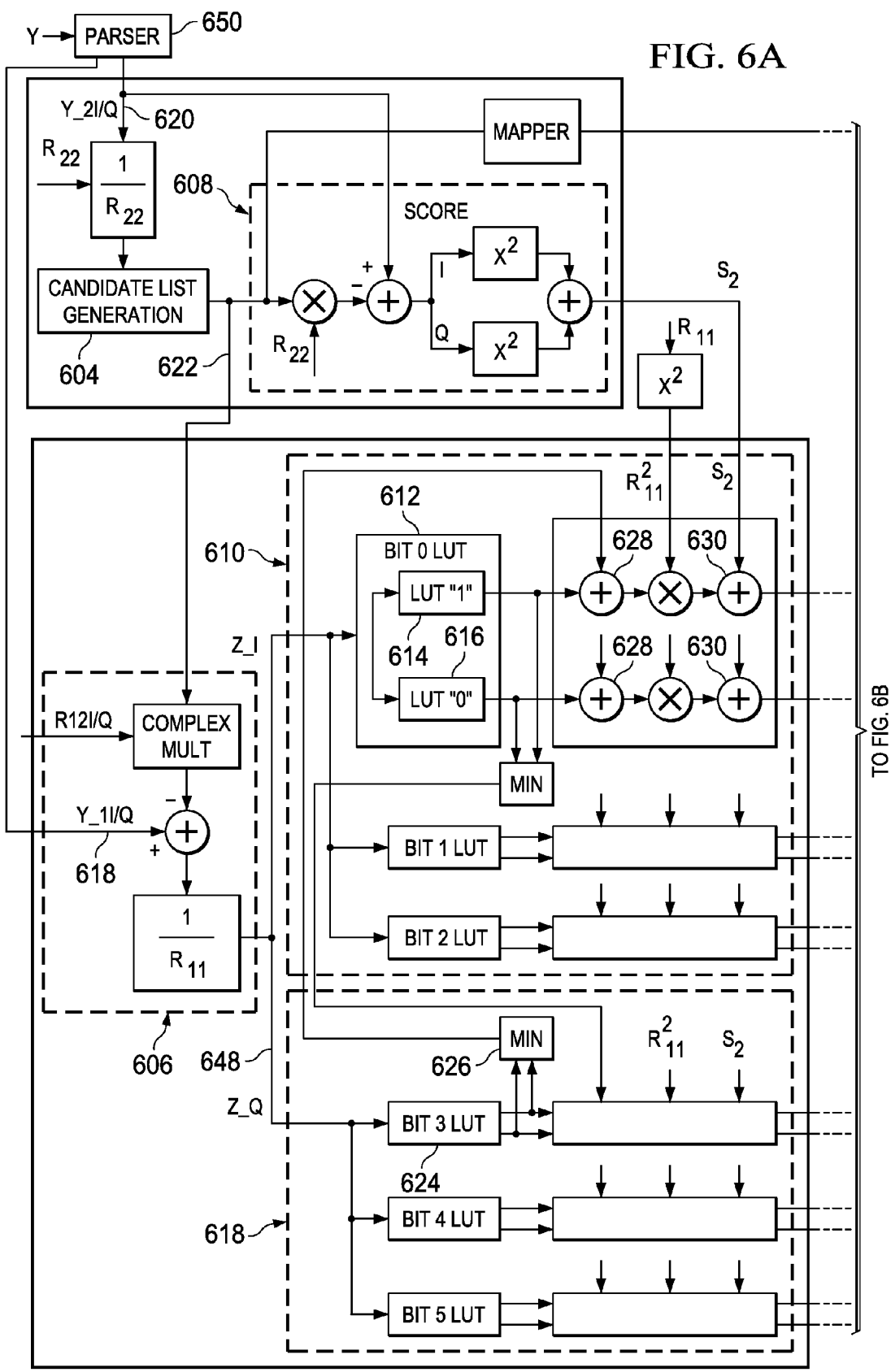
FIGS. 6A and 6B show an illustrative block diagram of the CLIC framework adapted to implement the Abbreviated Max-Log ("AML") architecture in accordance with at least some preferred embodiments of the invention.
Figure 6B:
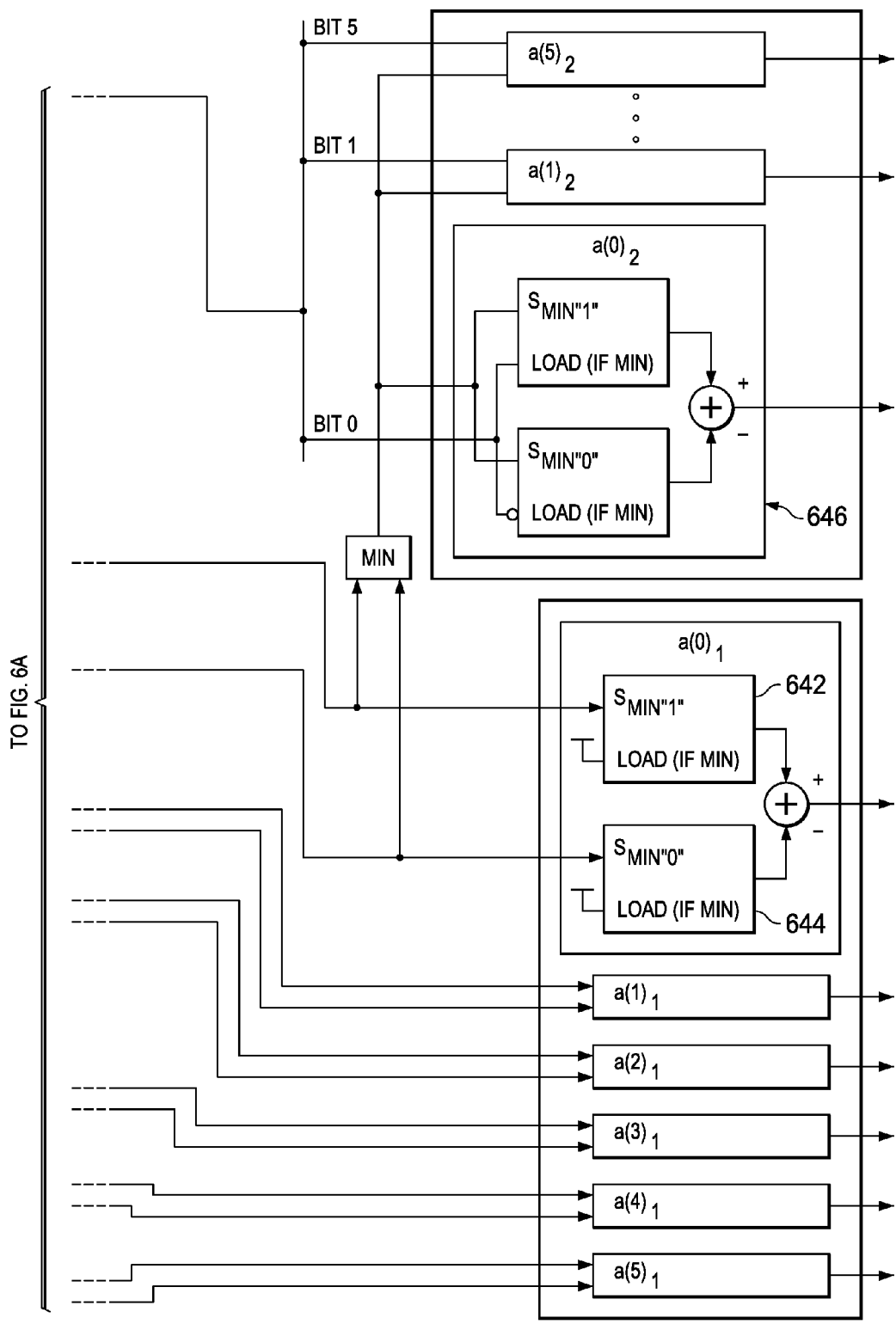

FIGS. 6A and 6B show an illustrative block diagram of the CLIC framework adapted to implement the AML architecture when N=2, S=1, and $A_2$=QAM-64. The channel output is parsed into two sets of elements 618, 620 by a parser 650. In this illustration, N=2 and S=1, thus each set 618, 620 contains a single element. A candidate list generator 604 provides a list of channel input candidate vectors 622 corresponding to channel output 620. The candidate list generator 604 may employ any list enumeration technique to generate the list of candidate vectors. The list of candidates 622 and the second channel output 618 are provided to interference canceller 606. The interference canceller 606 uses the candidate vectors 622 to remove interference from the channel output 618.

The output 648 of the interference canceller 606 is provided to a set of look-up tables ("LUTs") 610, 618 that perform an exhaustive list enumeration for the second (i.e. final) symbol. The LUTs 610, 618 comprise tables for the three real bits 610 of a QAM-64 symbol and the three imaginary bits 618 of a QAM-64 symbol. Further, the LUTs 610, 618 comprise tables for both the one value 614 and the zero value 616 of each bit.

The LUTs 610, 618 operate to compute a score for a symbol candidate in accordance with equations (24)-(30). Considering, for example, score computation for Bit 0 as initiated in Bit 0 LUT 612. A value is generated by LUTs 614, 616 for Bit 0 being a one and a zero respectively. This process is also performed for Bit 3 in LUT 624. The minimum of the values for Bit 3 being a one or a zero is determined in minimization logic 626 and summed in summers 628 with the values generated for Bit 0 to produce a score for Bit 0 of a symbol being a one and a zero. These scores are summed in summers 630 with scores for the vectors of candidate list 622 generated in score generator 608 to produce a cost for each bit value. The minimum cost for each bit being a zero and being a one is tracked in components 644 and 642 respectively. Similarly, the minimum cost for each bit of the candidate list 622 is tracked in component 646 using the unique bit patterns generated for each candidate by mapper 654. The difference between the minimum costs for the one and zero values of each bit is provided to other components (not shown) to complete the LLR computation. The components and processing described above in regard to Bit 0 are replicated for each of the remaining five bits of a QAM-64 symbol.

The CLIC framework, as herein disclosed, may be configured to enable a wide array of different MIMO detectors. Changing one or more of the parameters in the CLIC framework results in a different MIMO detector. Table 1 lists illustrative parameters for the CLIC framework, as well as exemplary values for implementing the ML detector and the AML detector. Specifically, if N=1 the generation of the list $L_1$ is a scalar operation that may be implemented according to a constellation sorting look-up table that exploits constellation symmetry and overlays a secondary constellation over a decision region of the primary constellation to reduce look-up table storage. This list generator uses the inherent symmetry in typical symbol constellations to store an exhaustive look-up table very efficiently. For more information regarding the constellation sorting look-up table see U.S. patent application Ser. No. 11/926,625, filed Oct. 29, 2007, and entitled "Candidate Generation" hereby incorporated herein by reference.

On the other hand, if N>2 any MIMO list detector may be used to generate the list $L_1$. For example, when N=2 the parameterized sphere detector is an example of a two-dimensional list generator. The two-dimensional list generator of the parameterized sphere detector provides an efficient way to enumerate a list of candidate vectors that is likely to contain the true channel input. It enumerates the candidate vectors in two phases. The first phase is an initialization phase, where one candidate for K different values of the first symbol is enumerated. In the next phase, more candidates are generated in a way that attempts to minimize the cost of the enumerated vectors. For more information regarding parameterized sphere candidate generation see U.S. patent application Ser. No. 11/928,863, filed Oct. 30, 2007, and entitled "Parameterized Sphere Detector and Methods of Using the Same" hereby incorporated herein by reference.

Another example of a multi-dimensional list generator that may be used to generate the list $L_1$ is the Leaf-Node prediction list detector. The Leaf-Node prediction list detector uses an algorithm that computes the number of unique candidates for the first symbol to include in the final list, as well as the number of unique candidate vectors that contain each of these values of the first symbol. For more information regarding Leaf-Node prediction list generation see U.S. provisional patent application Ser. No. 60/887,241, filed Jan. 30, 2007, and entitled "Low Complexity MIMO Detection with Analytical Leaf-Node Prediction" hereby incorporated herein by reference.

TABLE 1

List of exemplary parameters for the CLIC framework

| CLIC Parameter | ML detector | AML detector |
|---|---|---|
| Π | An identity matrix after its columns are permuted in any way. | An identity matrix after its columns are permuted in any way. |
| α | 0 | any value |
| S | $N \geq S \geq 0$ | $S = N - 1$ |
| $L_1$ | $A_{N-S+1}^N$ | if N = 1, scalar constellation sorting algorithm if N > 1, any MIMO list generator |
| $L_2$ | $A_1^{N-S}$ | $A_1^1$ |
| Algorithm for insufficient lists, only if $L_i < L_{i,Max}/2 + 1$ | N/A | As defined in equation (23) |

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, as a matter of convenience, embodiments of the invention have been described in terms of a narrowband system. However, embodiments of the invention are not so limited and are also applicable to wideband systems, such as Orthogonal Frequency Division Multiplexing ("OFDM") or Orthogonal Frequency Division Multiple Access ("OFDMA") systems where embodiments may be applied to each sub-carrier. Embodiments of this invention can also be applied to Code Division Multiple Access ("CDMA") systems, which can be represented by a narrowband channel in some implementations. Accordingly, the scope of protection is not limited to the embodiments described herein, but is only limited by the claims which follow, the scope of which shall include all equivalents of the subject matter of the claims.

What is claimed is:

1. A method for Multiple Input Multiple Output ("MIMO") detection comprising:
   parsing an N element channel output into a first set containing S elements and a second set containing N–S elements;
   generating a first list of candidate vectors from the first set of elements;

producing a set of interference cancelled elements with hardware interference canceller by using the first list of candidate vectors to remove interference from the second set of elements; and providing a log-likelihood ratio based on the first list of candidate vectors and the set of interference cancelled elements.

2. The method of claim 1, further comprising producing scores for the candidate vectors of the first list of candidate vectors.

3. The method of claim 1, further comprising generating a second list of candidate vectors from the set of interference cancelled elements.

4. The method of claim 3, further comprising producing for the one value and for the zero value of each bit of the second list of candidate vectors, a minimum score over all candidate vectors of the first list of candidate vectors.

5. The method of claim 4, further comprising producing a cost for a selected symbol bit value of the first list of candidate vectors by minimizing the sum of the scores of the first and second lists of candidate vectors over all candidate vectors of the first list of candidate vectors having the selected symbol bit value.

6. The method of claim 5, further comprising tracking the minimum cost for each bit of a candidate vector of the first list of candidate vectors.

7. The method of claim 4, further comprising producing a cost for the one value and for the zero value of each bit of a candidate vector of the second list of candidate vectors by minimizing, across the first list of candidate vectors, the sum of the scores of the first list of candidate vectors and a selected symbol bit value of each vector of the second list of candidate vectors.

8. The method of claim 7, further comprising tracking the minimum cost for each bit of a candidate vector of the second list of candidate vectors being a one and being a zero.

9. A system comprising:
a first candidate list generator that generates a first set of candidate vectors from a first set of elements;
a hardware interference canceller coupled to the first candidate list generator, the interference canceller produces a set of interference cancelled elements from a second set of elements and the first set of candidate vectors;
a second candidate list generator coupled to the interference canceller, the second candidate list generator generates a second set of candidate vectors from the set of interference cancelled elements;
a hardware first score generator coupled to the first list generator, the first score generator produces a score for a candidate vector of the first list of candidate vectors; and
a second score generator coupled to the second candidate list generator, the second score generator generates for the one value and for the zero value of each bit of each candidate vector of the second list of candidate vectors, a minimum score over all candidate vectors of the first list of candidate vectors.

10. The system of claim 9, further comprising a cost generator coupled to the first score generator and coupled to the second score generator, the cost generator produces a first cost for a selected symbol bit value of the first list of candidate vectors by minimizing the sum of the scores of the first and second lists of candidate vectors over all candidate vectors of the first list of candidate vectors having the selected symbol bit value, and produces a second cost for the one value and for the zero value of each bit of a candidate vector of the second list of candidate vectors by minimizing, across the first list of candidate vectors, the sum of the scores of the first list of candidate vectors and a selected symbol bit value of each vector of the second list of candidate vectors canceller.

11. The system of claim 10, further comprising a cost tracker coupled to the cost generator, the cost tracker tracks the minimum cost for each bit being a one and for each bit being a zero over all candidate vectors.

12. The system of claim 11, further comprising a log-likelihood ratio generator coupled to the cost tracker, the output of the log-likelihood ratio generator indicates the probability of whether a bit was transmitted as a one or a zero.

13. A system comprising:
a parser that partitions an N element channel output signal into an N−1 element channel output signal and a single element channel output signal;
a candidate list generator coupled to the parser, the candidate list generator produces a set of candidate vectors from the N−1 element channel output signal; and
a hardware interference canceller coupled to the parser and coupled to the candidate list generator, the interference canceller produces an interference cancelled signal from the set of candidate vectors and the single element channel output signal.

14. The system of claim 13, further comprising a look-up table coupled to the hardware interference canceller, the look-up table provides a value for computing a score for a first symbol over all candidates for a second symbol.

15. The system of claim 14, wherein the look-up table provides a value for computing the score for a bit of a symbol being a zero value, and provides a value for computing the score for a bit of a symbol being a one value.

16. The system of claim 15, wherein the look-up table further provides a value for computing the score for a bit assigned to a real portion of a symbol, and provides a value for computing the score for a bit assigned to an imaginary portion of a symbol.

17. The system of claim 16, further comprising:
a summer that sums the minimum look-up table output for a bit in the imaginary portion of a symbol with look-up table outputs for both a bit being a one and a bit being a zero in the real portion of a symbol to produce scores for both a one and a zero value of the bit in the real portion of the symbol; and
a summer that sums the minimum look-up table output for a bit in the real portion of a symbol with look-up table outputs for both a bit being a one and a bit being a zero in the imaginary portion of a symbol to produce scores for both a one and a zero value of the bit in the imaginary portion of the symbol.

18. The system of claim 13, further comprising a score generator coupled to the hardware interference canceller, the score generator computes the minimum score for each bit being and one and each bit being a zero across all candidates derived from the interference cancelled signal.

* * * * *